July 14, 1953 J. J. DALGLISH ET AL 2,645,073
MOWER MOUNTING
Filed March 18, 1950
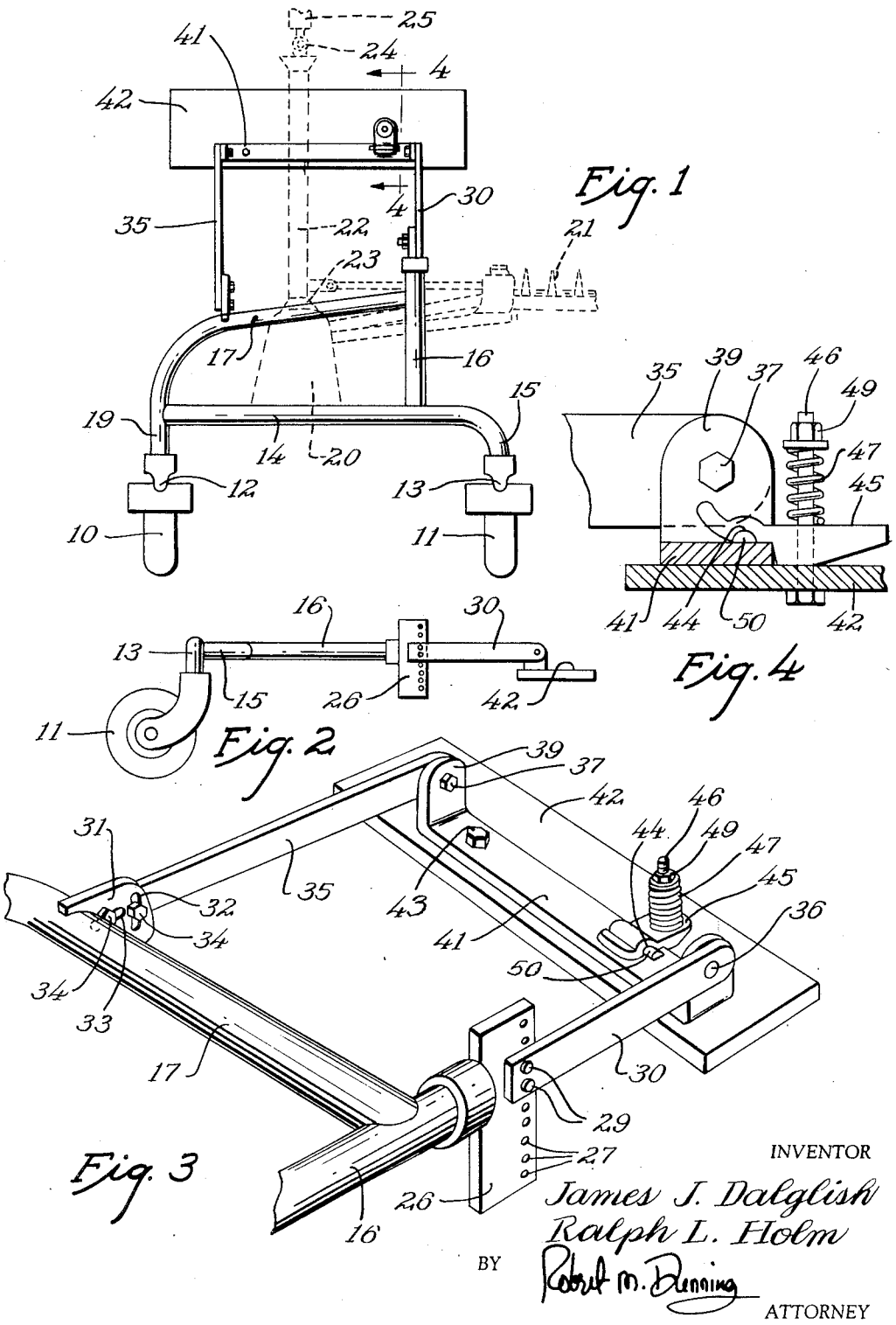
INVENTOR
James J. Dalglish
Ralph L. Holm
BY Robert M. Dunning
ATTORNEY Patented July 14, 1953

2,645,073

UNITED STATES PATENT OFFICE 2,645,073

MOWER MOUNTING

James J. Dalglish, St. Paul, and Ralph L. Holm, Minneapolis, Minn., assignors to Avco Manufacturing Corporation, Cincinnati, Ohio, a corporation of Delaware Application March 18, 1950, Serial No. 150,424

3 Claims. (Cl. 56—25)

This invention relates to an improvement in mower mounting wherein it is desired to provide a simple and effective means of connecting a mower of the trailer type to a tractor or similar implement.

Mowers of the trailer type which are supported at the rear end by one or more caster wheels and are dependent for support at their forward end by attachment to a tractor, must usually be designed for attachment with a tractor of one particular type. The draw bars at the rear of tractors of various types differ substantially in elevation. Accordingly in order to hold the mower frame on a level plane, it is necessary to design an attachment which will properly fit a draw bar supported at a predetermined elevation.

It is an object of the present invention to provide a mower frame having a means for attachment with a tractor draw bar that is adjustable to accommodate draw bars supported at various elevations. As a result the same mounting may be used for tractors of various makes and various styles.

In order to produce the proper result, it is necessary to connect the mower frame to the tractor so that it may pivot about a substantially horizontal transverse axis. This arrangement permits the mower to be drawn over uneven ground without difficulty, while still maintaining the mower frame on a substantially horizontal plane. At the same time it is necessary to support the mower frame, or at least the mower blade in such a manner that it may swing rearwardly along a vertical axis in the event the cutter blade strikes an obstruction.

A feature of the present invention lies in the fact that the mounting of the present invention incorporates pivots arranged on a transverse substantially horizontal axis and at the same time permits the frame to pivot about a substantially vertical axis.

A further feature of the present invention resides in the particular means employed for holding the mower frame in proper relation to the tractor draw bar during normal use of the mower. This means is releasable to permit the frame to pivot in the event the cutter bar strikes an obstruction.

These and other objects and novel features of the present invention will be more clearly and fully set forth in the following specification and claims.

In the drawings forming a part of the specification:

Figure 1 is a diagrammatic plan view of the mower frame for attachment to a tractor showing the general relationship of the parts.

Figure 2 is a side elevational view of the mower frame, the cutter bar and operating mechanism having been removed therefrom and showing the manner in which the frame is connected to the draw bar.

Figure 3 is an enlarged perspective view showing the tractor attachment in preferred form.

Figure 4 is an enlarged sectional view through the tractor draw bar and attached portion of the mounting, the position of the section being indicated by the line 4—4 of Figure 1.

The mower frame is shown in general in Figures 1 and 2 of the drawings. Caster wheels 10 and 11 are supported in vertical bearings 12 and 13 at the rear end of the frame. The frame illustrated includes a transverse tubular member 14 having a rearwardly turned extremity 15 to which the bearing 13 is attached. A longitudinally extending frame member 16 is connected at its rear end to the tubular member 14. An angularly extending frame member 17 is connected to the frame member 16 near the forward end thereof and angles laterally and rearwardly, terminating in a rearwardly turned extremity 19 supporting the bearing 12. The frame members are preferably welded together for strength and rigidity.

In view of the fact that the operating mechanism of the mower forms no important part of the present invention, this structure is not shown in detail and is merely shown somewhat diagrammatically. A drive mechanism 20 is mounted between the frame members 14 and 17. Suitable gearing is provided within the drive unit 20 to transmit power from the tractor to the cutter bar illustrated in general by the numeral 21. An extensible and contractable drive connection 22 is connected by a universal joint 23 to the drive unit 20 and is connected at its other end through a suitable universal joint 24 to the power take-off 25 of the tractor. Thus rotative power is transmitted through the extensible shaft 22 to the power unit 20 and acts through suitable connecting mechanism to reciprocate one or both of the cutter blades in the cutter bar 21.

The forward end of the frame member 16 is provided with an attachment plate 26, best illustrated in Figures 2 and 3 of the drawings. This plate extends vertically and is provided with a series of apertures 27 in equally spaced relation near its forward edge. These apertures 27 are designed to accommodate attachment bolts or pins 29 to attach the plate 26 to the adjustable link 30. The bolts 29 secure the link 30 rigidly to the plate 26 and thus to the mower frame. The link 30 forms an extension of the frame and provides one of the connecting members connecting the mower frame to the tractor.

A second plate 31 is connected to the frame bar 17 in parallel relation to the plate 26. The attachment plate 31 is provided with a vertical slot 32 and a horizontal slot 33. In the form of construction illustrated the vertical slot 32 is near the forward edge of the attachment plate 31 and the horizontal slot is rearwardly thereof. Alternatively, however, the position of these slots may be reversed. The slots 32 and 33 are designed to accommodate attachment bolts or bars 34 designed to connect the plate 31 to a forwardly extending link 35. The slots 32 and 33 permit the angularity between the plate 31 and the link 35 to be changed without changing the spacing between the bolts 34. By tightening the bolts 34, link 35 may be held in any desired angular relation to the plate 31.

The forward ends of the links 30 and 35 are apertured to accommodate aligned pivots 36 and 37, respectively. These pivots 36 and 37 extend through upwardly directed ears 40 and 39, respectively, at opposite ends of a connecting bar 41. The arms 30 and 35 may thus swing in unison about the pivots 36 and 37 to permit the mower to raise or lower in passing over uneven ground.

The bar 41 is connected to the tractor draw bar 42 by means of a vertical pivot bolt 43. The pivot bolt 43 extends through the bar 41 near one end thereof and in the form shown, this bolt 43 is near the bar end bearing the ear 39. The bar 41 is pivotal about this pivot bolt 43. Means is provided to normally restrain the bar 41 from pivotal movement relative to the fixed draw bar 42.

An elongated upwardly extending projection 50 extends longitudinally of the bar 41 on the upper surface thereof. This projection 50 is designed for accommodation in the groove 44 of a clamp 45. The clamp 45 is held in place by a clamping bolt 46 extending through the body of the clamp and through the draw bar 42. A spring 47 is interposed between the clamp body and a nut 49 on the bolt 46. Thus the clamp is resiliently urged against the bar 41 and engages the projection 50 thereupon. However, upon an excessive rearward pull upon the link 30, the spring 47 may compress sufficiently to allow the clamp 45 to pass over the projection 50 and to be disengaged from the bar 41. The bar and the frame pivotally connected thereto may thus pivot about the vertical pivot 43.

In accordance with the patent statutes, the principles of construction and operation of the mower mounting have been described, and while it has been endeavored to set forth the best embodiment thereof, it is desired to have it understood that obvious changes may be made within the scope of the following claims without departing from the spirit of the present invention.

We claim:

1. In a mower the combination comprising a mower frame supported at one end by ground engaging means, a tractor drawbar, bracket means pivotally connected on the stubbleward side to said drawbar for rotation around a vertical axis, releasable resilient clamp means mounted on the grassward side in spaced relation from the vertical pivot axis along the longitudinal axis of said bracket for normally restraining said bracket from pivotal movement, and a pair of spaced link means each adjustably connected to a separate fixedly attached vertical plate on said mower frame and each pivotally connected to an associated bracket end for rotation around a horizontal axis parallel to the longitudinal axis of said bracket, the horizontal pivot axis, the vertical pivot axis between said bracket and said drawbar, and said releasable clamp means all lying substantially in a common vertical plane and substantially in a common horizontal plane.

2. The structure defined in claim 1 wherein the connection between one of the link means and its associated plate is rotatably adjustable and wherein the connection between the other link and its associated plate is vertically adjustable.

3. The structure defined in claim 2 wherein the rotatably adjustable connection between said one of the link means and its associated plate is on the stubbleward side of said mower frame and wherein the vertically adjustable connection between said other link and its associated plate is on the grassward side of the mower frame.

JAMES J. DALGLISH.
RALPH L. HOLM.

References Cited in the file of this patent

UNITED STATES PATENTS

| Number | Name | Date |
|---|---|---|
| Re. 22,171 | Paul | Sept. 1, 1942 |
| 1,887,352 | Huddle | Nov. 8, 1932 |
| 2,171,761 | Paradise et al. | Sept. 5, 1939 |
| 2,225,156 | Coultas | Dec. 17, 1940 |
| 2,304,421 | Rogers | Dec. 8, 1942 |
| 2,520,743 | Tanke | Aug. 29, 1950 |